Figure 1:
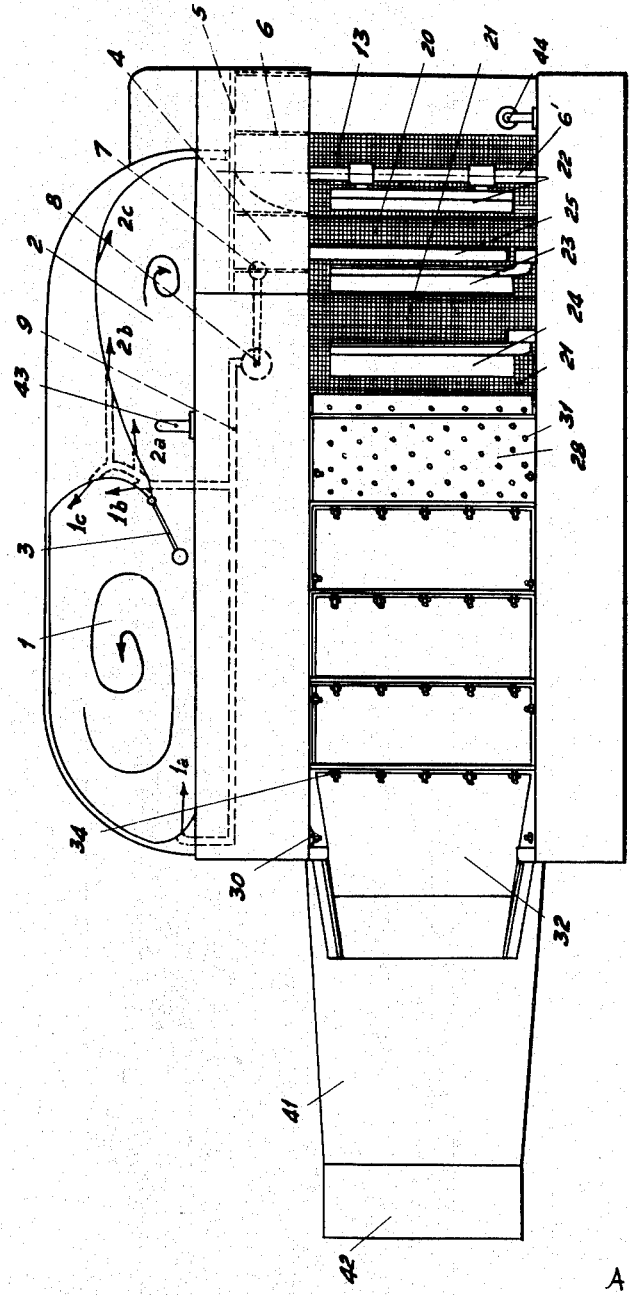

Jan. 4, 1966                  A. ZICHE                  3,226,749
AUTOMATIC MACHINE FOR SORTING, WASHING AND POLISHING
PHIALS OR CLOSED TUBULAR VESSELS IN GENERAL
Filed July 3, 1963                                3 Sheets-Sheet 1

INVENTOR.
Arrigo Ziche
BY Richards & Geier
attorneys

Jan. 4, 1966 A. ZICHE 3,226,749
AUTOMATIC MACHINE FOR SORTING, WASHING AND POLISHING
PHIALS OR CLOSED TUBULAR VESSELS IN GENERAL
Filed July 3, 1963 3 Sheets-Sheet 2

INVENTOR.
Arrigo Ziche
BY
Richard Geier
attorneys

3,226,749
AUTOMATIC MACHINE FOR SORTING, WASHING AND POLISHING PHIALS OR CLOSED TUBULAR VESSELS IN GENERAL
Arrigo Ziche, Via C. Cattaneo 1, Vicenza, Italy
Filed July 3, 1963, Ser. No. 292,705
7 Claims. (Cl. 15—4)

This invention relates to an automatic machine for washing, drying and polishing phials or tubular vessels in general, as well as for sorting them according to their weight.

The basic object of this invention is to provide a machine of the above-specified type, working in a simple way and having a comparatively simplified construction and consequently a low production cost, coupled with a high efficiency.

In those industries where phials or tubular vessels in general have to be filled with liquid substances, and especially in pharmaceutical industries, it is necessary to sort out any incompletely filled or broken phials.

On the other hand, the phials or tubular vessels filled correctly must be accurately washed, dried and polished, in order to render their outer surface perfectly smooth and clean.

All the above operations have so far required a great deal of labour, which determined a considerable increase of the production cost, while in addition the necessary accuracy was not always guaranteed.

When the machine herein referred to is employed, the above-described operations are performed quite automatically, and the only manual labour required is the one needed to feed the phials or tubular vessels to be treated into the machine and to remove those already treated, while it is obvious that these operations could be rendered automatic as well, for instance by means of conveyor belts.

Among the main parts of the machine there is a sorting basin, in which streams of fluid are set flowing, apt to sort out broken and overfilled phials, which sink to the bottom, as well as those incompletely filled, which float flat on the surface.

The phials filled correctly pass through a partition with an adjustable gap into a further section of the basin, from which they are removed by a special mechanical apparatus and transferred onto a vibrating wire screen; here they are washed by a jet of water, after which they are moved along by rotating paddles onto an inclined plane of the same wire screen, to which a holed cloth is fastened, while a few small fixed bags, made of cloth as well, and filled with inert material, lie on the phials or tubular vessels and wipe them uniformly till they become dry and thoroughly polished.

The inclined screen secures the regular advance of the phials or tubular vessels, which at the end of it, are unloaded onto a special conveyor.

During the drying operation the phials are submitted to jets of warm air.

Figure 3:
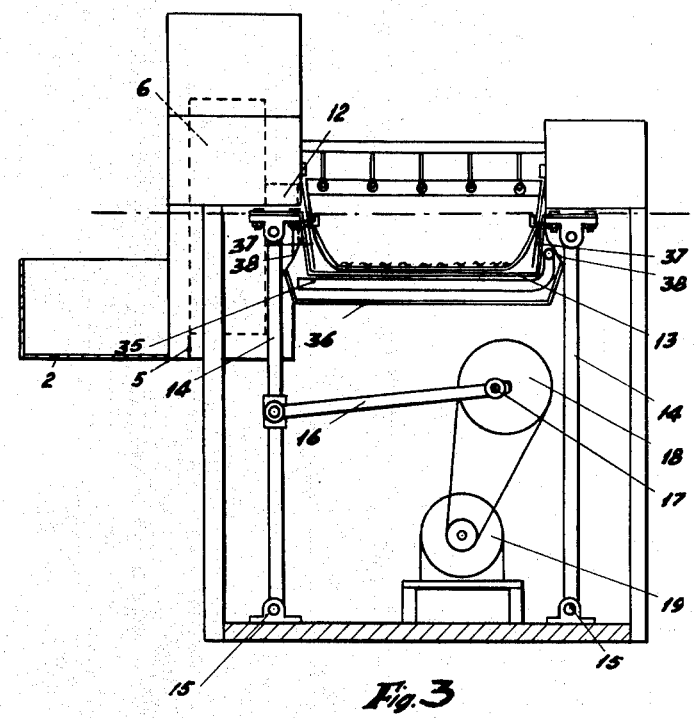
Figures 4, 5, 6:
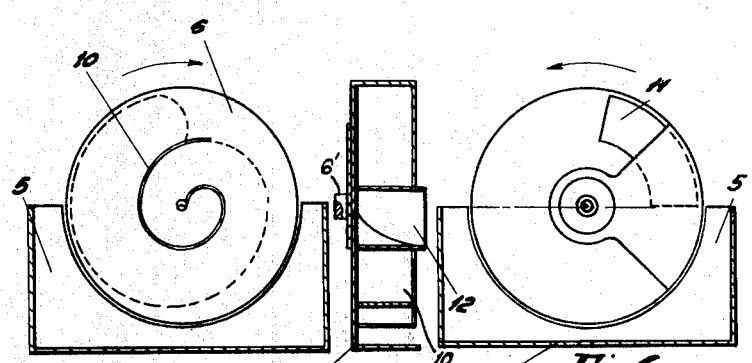

The constructional details of the machine will be illustrated below with reference to the annexed set of drawings, in which FIG. 1 is a plan view of the machine, FIG. 2 its longitudinal section and FIG. 3 its transverse section, FIG. 4 a transverse section of the revolving-spiral device for transferring the phials from the basin to the vibrating screen, FIG. 5 is an axial section and FIG. 6 an external view of said device.

The cycle of the machine begins in the sorting and washing basin (FIG. 1), divided by the adjustable-gap partition 3 into the two sections 1 and 2. The phials or tubular vessels are introduced into section 1 and selected according to their weight.

Inside section 1 the jets of water 1a–1b–1c are placed in such a way that their directions are almost tangential to the side surface of the basin, in order to bring about a vortex in the central area of the said basin.

The same is true of section 2, in the central area of which another vortex is produced by the tangential jets 2a–2b–2c.

The basin 1–2 is connected with the supplementary section 4, which is separated from section 2 by a vertical partition 5, including the side surface of the revolving drum 6. The drum 6 is rotated by the shaft 6' which is driven by any suitable mechanism not shown in the drawing. On the bottom of section 4 of the basin is placed a suction pipe 7 connected, via the rotary pump 8 and the delivery pipe 9, with the jets 1a–1b–1c and 2a–2b–2c; thus the water circulates continually.

The phials or tubular vessels introduced into section 1 of the basin are sorted out according to their weight. In fact those phials which are broken or overfilled sink to the bottom of the basin 1, and are collected at the centre of the said basin by the vortex that the tangential jets produce therein; while the phials incompletely filled float on the surface and are easily removed by the staff in charge of the machine.

Only the phials filled correctly pass, in a controlled amount, through the adjustable opening 3 into section 2 of the basin, from where they are removed by the revolving-spiral device 6 (FIG. 2), which takes away a uniform and adjustable number of them at each revolution.

Figure 2:
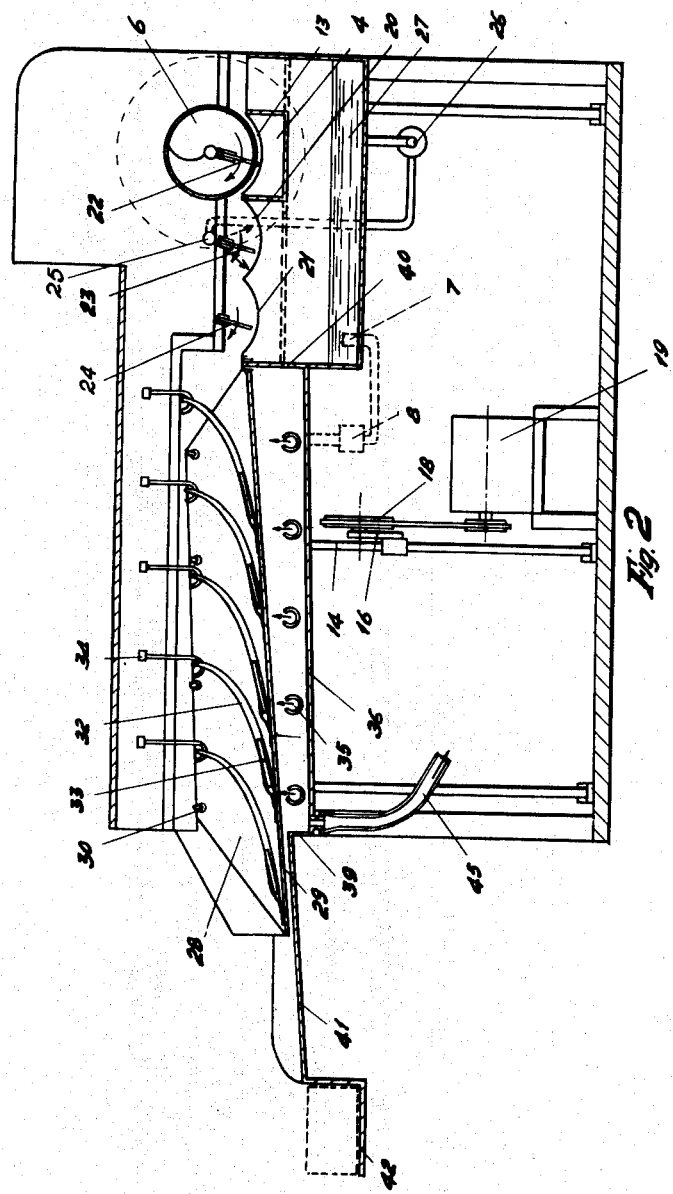

Said device 6 (FIGURES 4–5–6) is fitted internally with a spiral wall 10 partly of plate and partly of wire netting, suitably shaped in its transverse section, as shown in FIG. 5, which revolves in the direction indicated by the arrows, and thus conveys the phials picked up from the basin 2 through the adjustable-gap opening 11 (FIG. 6) towards the central channel 12 (FIG. 5), from which they are then unloaded onto the vibrating screen 13 (FIG. 2).

Thus the device 6 picks up an adjustable amount of phials at each passage of the opening 11 in contact with the water contained in the basin 2, as a result of the different levels in the basins 2 and 4.

It is obvious that, at each passage of the opening 11, from the section 2 of the basin also a certain amount of water is absorbed, which discharges into section 4, from where it is taken back to circulation by the rotary pump 8.

The width of the opening 11 will be adjusted according to the type and dimensions of the phials or tubular vessels to be sorted, and according to the amount of production required.

The vibrating wire screen 13 (FIG. 3) covers the entire length of the machine and is supported by couples of posts 14, hinging on the pivots 15 and vibrated through the connecting rod 16, which in turn is driven by the crank 17, mounted on the flywheel 18, rotated by the electric motor 19.

In its initial section the wire screen 13 (FIG. 2) is shaped in the form of three arcs of a cylindrical surface 13–20–21 interconnected, on which the phials or tubular vessels are pushed forward by the revolving paddles 22–23–24, preferably made of plates of rubber or other flexible material.

The phials or tubular vessels unloaded on the first arc 13 of the vibrating screen drip their water into the extension of the basin 4, which stretches underneath the section 13 of the screen.

While passing on the second arc 20 (FIG. 1) the phials or tubular vessels are washed by a jet of water falling from a slot on the tubular part 25 placed above the said arc.

The spout 25 (FIG. 2) is fed by the circulating pump 26, which raises the water from the bottom of the basin 27.

Then the phials or tubular vessels pass onto the section 21, where they drip their water again; hence the paddle 24 transfers them onto the holed cloth 28 stretched over the final portions 29 of the vibrating screen, in the form of an inclined plane.

The cloth 28 is secured by the hooks 30 and has holes 31 (FIG. 1), which can be kept open by clenched metal eyelets.

The phials or tubular vessels glide down the inclined plane 29 covered with the holed cloth 28 and are then wiped by the bags of cloth 32 fastened to the hooks 34, which can be internally fitted with ballasts 33 of rubber or other inert material.

Through the screen and the holes of the cloth 28 the phials or tubular vessels are hit by the warm air coming from the feed tubes 35 and, at the same time, are dried and polished by the cloth bags 32 lying on them.

The bottom plate 36 (FIGURES 2 and 3) serves as a drop collector and facilitates the transfer of the warm air from the tubes 35 upwards.

Between the side walls of the vibrating screen 29 and the fixed walls of the machine there are placed linings 37 (FIG. 3) of elastic material, such as rubber, that absorb any shocks of the phials or tubular vessels against the said side walls.

The elastic side membranes 38, connecting the sides of the cup 36 and the side walls of the vibrating screen 13, form with the bottom of the said cup 36 the two ends 39-40 (FIG. 2) of the same, and with the wire screen 29, covered with the holed cloth 28, a container of warm air, discharging only upwards through the holes of the cloth 28.

The phials or tubular vessels dried and polished are finally unloaded by the conveyor 41 into boxes placed at the end of it on the supporting plane 42.

The cocks 43-44 (FIG. 1) respectively feed the washing basin 1-2-4 and the basin 27 (FIG. 2) with clean water.

The description of the machine suggests how it works.

The phials or tubular vessels are introduced into the first section 1 of the washing basin, where they are sorted out.

Then the phials or tubular vessels correctly filled go into the second basin 2, where they are thoroughly washed, and hence they are picked up by the revolving-spiral device 6, which deposits them on the first section 13 of the vibrating screen.

Here the phials or tubular vessels drip their surface water and are then pushed by the paddle 22 onto the second section of the vibrating screen 20, where they are rinsed by a jet of clean water falling from the tubular part 25.

Then they drip again their surface water in the third section 21 of the vibrating screen, and the paddle 24 takes them finally onto the holed cloth 28.

The phials or tubular vessels are then dried and thoroughly polished by the cloth bags 32, and at the same time are hit by the warm air coming from the tubes 35, while the residual water drips on the collector 36, which is slightly sloping, and discharges into the downpipe 45. Finally the phials or tubular vessels go, via the conveyor 41, into the containers placed on the supporting plane 42.

It is understood that the constructional details of the machine can be modified with respect to those here described and illustrated in the annexed set of drawings, without departing from the innovating principle of the invention as set forth in the claims.

What is claimed is:

1. An automatic machine for washing, drying and polishing phials or closed tubular vessels in general, as well as for sorting them out according to their weight, comprising, in combination, a washing basin having a partition, said partition having an adjustable opening and separating the interior of the washing basin into two sections, means located in the interior of each of said sections for supplying jets of water extending substantially horizontally and tangentially to the side surfaces of the basin, whereby a vortex of water is formed in each section, a vibrating screen, a mechanical pick-up device for transferring vessels from the second section upon said vibrating screen, means for rinsing, drying and polishing the vessels upon said vibrating screen, and means constituting an inclined discharge plane receiving the dried and polished vessels.

2. An automatic machine for washing, drying and polishing phials and other closed tubular vessels and for sorting them according to their weight, said machine comprising a washing and sorting basin having two sections, means within one of said sections for producing a vortex of fluid therein, whereby broken or over-filled vessels sink to the bottom, an adjustable opening located between the two sections, whereby correctly filled vessels pass through said opening into the second section, while incompletely filled vessels float on the surface of the fluid in the basin and can be removed therefrom, a vibrating screen, a pickup device for transferring vessels from the second section upon said vibrating screen, means for rinsing, drying and polishing the vessels upon said vibrating screen, and means constituting an inclined discharge plane receiving the dried and polished vessels, wherein the pickup device consists of a revolving spiral wall enclosed in a cylindrical box fitted with an adjustable opening and rotating with said spiral wall, which device takes from the washing basin a certain amount of fluid along with the phials or tubular vessel therein contained, and then lifts up and transfers them onto said vibrating screen, whereby they are there rinsed, dried and polished.

3. A machine as defined in claim 2, in which the vibrating screen, on which the phials or tubular vessels picked up from the washing basin are deposited, has one or more sections in the form of arcs of a cylindrical surface, on which they are pushed forward by rotating paddles, whereby in at least one of them the phials or tubular vessels are rinsed by a jet of clean water.

4. A machine as defined in claim 3, in which the final section of the vibrating wire screen on which the phials or tubular vessels advance is an inclined plane covered with a holed cloth, on which sit a number of small bags filled with inert material and fastened by hooks to the frame of the machine; whereby said bags, rubbing the phials or tubular vessels, dry and polish them thoroughly.

5. A machine as defined in claim 4, in which below the vibrating wire screen is placed a number of feed tubes, which send jets of warm air upwards in the direction of the phials or tubular vessels moving forward on the holed cloth.

6. A machine as defined in claim 5, in which underneath the tubes conveying the warm air is placed a drop-collecting plane fitted with elastic side walls, whereby the transfer of the warm air is facilitated.

7. A machine as defined in claim 6, in which the wire screen is vibrated, through an appropriate mechanism, by a driving electric motor.

References Cited by the Examiner

UNITED STATES PATENTS

| | | | |
|---|---|---|---|
| 1,952,429 | 3/1934 | Ghent et al. | 15—3.16 |
| 1,964,275 | 6/1934 | Secondo | 15—3.15 |
| 2,003,275 | 5/1935 | Brogden | 15—3.16 |
| 2,732,987 | 1/1956 | Moore | 15—3.13 X |
| 2,996,741 | 8/1961 | Fox et al. | 15—3.14 |

FOREIGN PATENTS 540,744   3/1956   Italy.

CHARLES A. WILLMUTH, *Primary Examiner.*

WALTER A. SCHEEL, *Examiner.*